United States Patent
Duggan et al.

(10) Patent No.: US 7,004,840 B1
(45) Date of Patent: Feb. 28, 2006

(54) INTERNAL BALANCE CORRECTION DEVICE FOR VEHICULAR DRIVESHAFT ASSEMBLY

(75) Inventors: James A. Duggan, Temperance, MI (US); Barry L. Zackrisson, Bradenton, FL (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/664,811

(22) Filed: Sep. 17, 2003

Related U.S. Application Data

(60) Provisional application No. 60/411,196, filed on Sep. 17, 2002.

(51) Int. Cl.
*F16C 3/00* (2006.01)

(52) U.S. Cl. ..................... 464/127; 464/180
(58) Field of Classification Search ............. 464/127, 464/180; 73/469, 487; 74/573 R, 574
See application file for complete search history.

(56) References Cited

U.S. PATENT DOCUMENTS

| | | | |
|---|---|---|---|
| 1,678,887 A | 7/1928 | Trumpler | |
| 1,730,019 A * | 10/1929 | Trumpler | .................. 73/469 |
| 2,439,035 A | 4/1948 | Bidwell et al. | |
| 3,094,003 A | 6/1963 | Hemmeter | |
| 3,888,128 A * | 6/1975 | Mitchell | ................. 73/487 X |
| 4,060,009 A * | 11/1977 | Wyman | ................... 74/573 R |
| 4,440,123 A * | 4/1984 | Tsai | ..................... 464/180 X |
| 5,884,735 A * | 3/1999 | Eckel et al. | ............ 74/574 X |
| 5,976,020 A * | 11/1999 | Lohaus et al. | .......... 74/574 X |
| 2005/0050984 A1 * | 3/2005 | Kim | ........................ 74/573 R |

* cited by examiner

*Primary Examiner*—Greg Binda
(74) *Attorney, Agent, or Firm*—MacMillan, Sobanski & Todd, LLC

(57) ABSTRACT

A balance correction device is supported within a hollow article, such as a driveshaft assembly for a vehicular drive train system, to balance the article for rotation. The balance correction device includes a first disc having a first slot provided therein and a second disc having a second slot provided therein. Portions of the first and second slots are axially aligned with one another. An object, such as a ball, is received within the axially aligned portions of the first and second slots. The first and second discs can be positioned relative to one another to position the object relative to the unbalanced article to balance the unbalanced article for rotation.

5 Claims, 5 Drawing Sheets

INTERNAL BALANCE CORRECTION DEVICE FOR VEHICULAR DRIVESHAFT ASSEMBLY

CROSS REFERENCE TO RELATED APPLICATION

This application claims the benefit of U.S. Provisional Application No. 60/411,196, filed Sep. 17, 2002, the disclosure of which is incorporated herein by reference.

BACKGROUND OF THE INVENTION

This invention relates in general to drive train systems for transferring rotational power from a source to a driven mechanism, such as from a vehicular engine/transmission assembly to an axle assembly. In particular, this invention relates to a balance correction device that is adapted to be supported within a driveshaft assembly of such a drive train system for balancing the driveshaft assembly for rotation about an axis.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Ideally, the driveshaft tube would be formed in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tube and other components of the driveshaft assembly usually contain variations in roundness, straightness, and wall thickness that result in minor imbalances when rotated at high speeds. To prevent such imbalances from generating undesirable noise or vibration when rotated during use, therefore, it is commonplace to counteract such imbalances by performing a corrective action, such as by securing one or more balance weights to the driveshaft assembly or by removing material therefrom, for example. The corrective action is taken to counterbalance the imbalances of the driveshaft assembly such that it is balanced for rotation during use.

Traditionally, the balancing process has been performed with the use of a conventional balancing machine. A typical balancing machine includes a pair of fittings that are adapted to support the ends of the driveshaft assembly thereon. The balancing apparatus further includes a motor for rotating the driveshaft assembly at a predetermined speed. As the driveshaft assembly is rotated, the balancing machine senses vibrations that are caused by imbalances in the structure of the driveshaft assembly. The balancing machine is responsive to such vibrations for determining both if the driveshaft assembly is out of balance and, if so, the magnitude and location of a corrective action that can be taken to counterbalance the imbalances of the driveshaft assembly such that it is balanced for rotation during use. The rotation of the driveshaft assembly is then stopped to allow such corrective action to be taken. Then, the driveshaft assembly is again rotated to confirm whether proper balance has been achieved or to determine if additional corrective action required. A number of such balancing machines of this general structure and method of operation are known in the art.

In the past, vehicular driveshaft tubes have been formed from steel alloys or other metallic materials having relatively large wall thicknesses and having relatively high melting temperatures. In such driveshaft tubes, conventional welding processes have been commonly used to secure the balance weights directly to the outer surfaces thereof. Because of the relatively large wall thicknesses and relatively high melting temperatures of such driveshaft tubes, the heat generated during the welding process does not adversely distort the shape or affect the torque-transmitting capacity thereof in a significant manner. However, in some instances, it is desirable to form the driveshaft tubes having relatively small wall thicknesses or from materials having relatively low melting temperatures. For example, in racing vehicles, it may be desirable to minimize the wall thickness of the driveshaft tube to reduce weight. Also, it may be desirable to form the driveshaft tubes from aluminum alloys and other relatively lightweight metallic materials that have relatively low melting temperatures. The use of conventional welding processes to secure the balance weights directly to the outer surfaces of the driveshaft tubes in either of these instances is somewhat more difficult because the heat generated during the welding process may undesirably distort the shape or affect the torque-transmitting capacity thereof in a significant manner. Thus, it would be desirable to provide an improved structure for rotationally balancing an article, such as a driveshaft assembly for use in a vehicular drive train system, that avoids these problems.

SUMMARY OF THE INVENTION

This invention relates to a balance correction device that is adapted to be supported within a driveshaft assembly of such a drive train system for balancing the driveshaft assembly for rotation about an axis. The balance correction device includes a first disc having a first slot provided therein and a second disc having a second slot provided therein. Portions of the first and second slots are axially aligned with one another. An object, such as a ball, is received within the axially aligned portions of the first and second slots. The first and second discs can be positioned relative to one another to position the object relative to the unbalanced article to balance the unbalanced article for rotation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
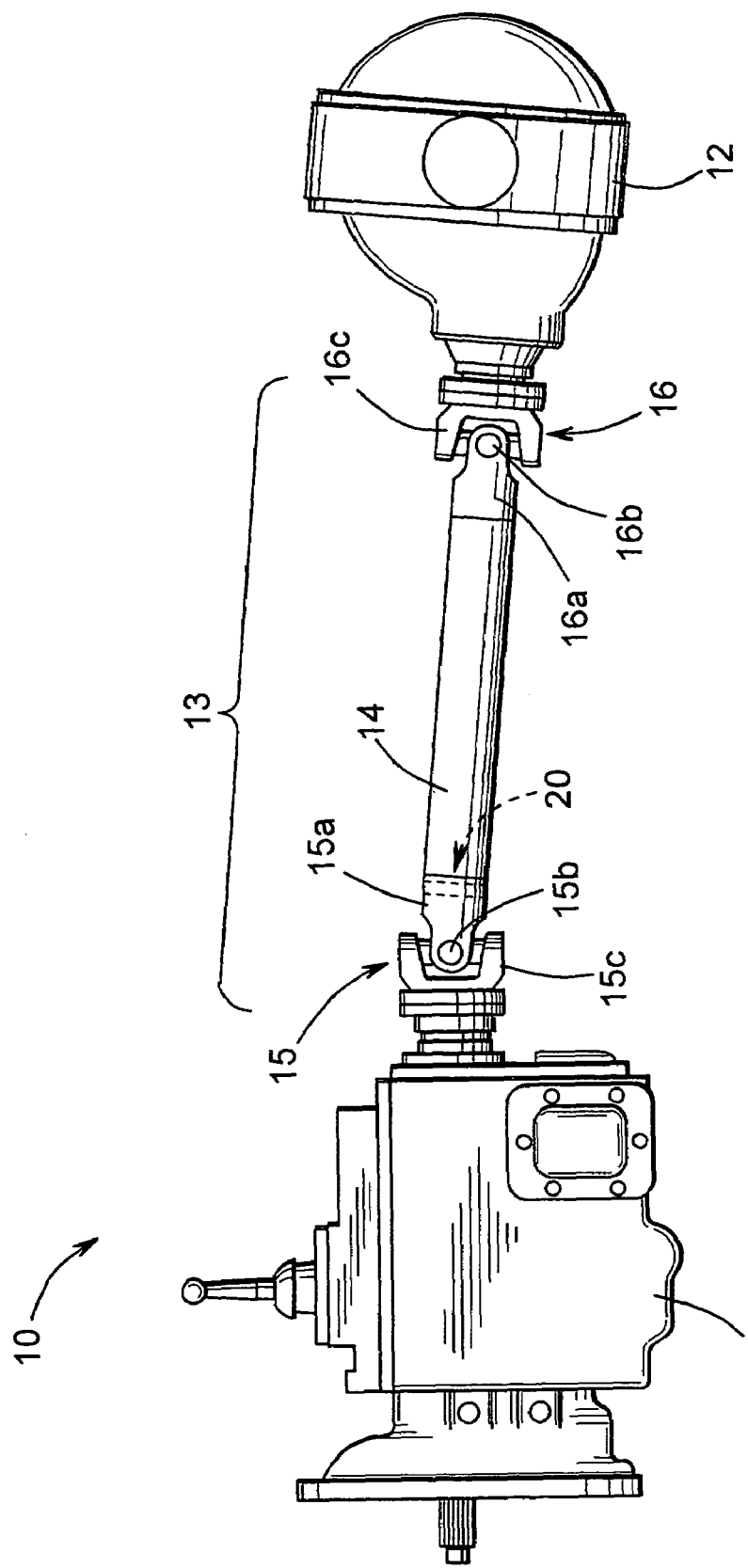
FIG. 1 is a side elevational view of a vehicle drive train system including a driveshaft assembly having an internal balance correction device in accordance with this invention provided therein.

Referring now to the drawings, there is illustrated in FIG. 1 a drive train system, indicated generally at 10, for a vehicle that is adapted to transmit rotational power from an engine/transmission assembly 11 to a plurality of driven wheels (not shown). The illustrated drive train assembly 10 is, for the most part, conventional in the art and is intended merely to illustrate one environment in which this invention may be used. Thus, the scope of this invention is not intended to be limited for use with the specific structure for the vehicle drive train assembly 10 illustrated in FIG. 1 or to vehicle drive train assemblies in general. On the contrary, as will become apparent below, this invention may be used to balance any other desired article for rotation.

The illustrated drive train system 10 includes a transmission 11 having an output shaft (not shown) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft of the transmission 111 and the input shaft of the axle assembly 12 are typically not co-axially aligned. To accommodate this, a pair of universal joints, indicated generally at 15 and 16, are provided to respectively connect the end portions of the driveshaft tube 14 to the output shaft of the transmission 11 and to the input shaft of the axle assembly 12. The first universal joint 15 includes a tube yoke 15a that is secured to the forward end portion of the driveshaft tube 14 by any conventional means, such as by welding. The first universal joint 15 further includes a cross 15b that is connected to the tube yoke 15a in a conventional manner. Lastly, the first universal joint 15 includes an end yoke 15c that is connected to the output shaft of the transmission 11 and to the cross 15b. Similarly, the second universal joint 16 includes a tube yoke 16a that is secured to the rearward end portion of the driveshaft tube 14 by any conventional means, such as by welding. The second universal joint 16 further includes a cross 16b that is connected to the tube yoke 16a in a conventional manner. Lastly, the second universal joint 16 includes an end yoke 16c that is connected to the cross 16b and to the input shaft of the axle assembly 12. The front and rear universal joints 15 and 16 provide a rotational driving connection from the output shaft of the transmission 11 through the driveshaft tube 14 to the input shaft of the axle assembly 12, while accommodating a limited amount of angular misalignment between the rotational axes of these three shafts.

An internal balance correction device, indicated generally at 20, is provided within a portion of the driveshaft assembly 13. In the illustrated embodiment, the internal balance correction device 20 is disposed within a sleeve portion of the tube yoke 15a. In the illustrated embodiment, the internal balance correction device 20 press fit within the sleeve portion of the tube yoke 15a. However, the internal balance correction device 20 may be retained within the sleeve portion of the tube yoke 15a in any desired manner. Also, if desired, the internal balance correction device 20 may be disposed elsewhere within the driveshaft assembly 13. For example, the internal balance correction device 20 may be disposed within the driveshaft tube 14. Furthermore, although only one of the internal balance correction devices 20 is shown in the illustrated embodiment, it will be appreciated that a plurality of such internal balance correction devices 20 may be provided within the driveshaft assembly 13. For example, a pair of such internal balance correction devices 20 may be provided within each of the tube yokes 15a and 16a of the driveshaft assembly 13.

Figure 2:
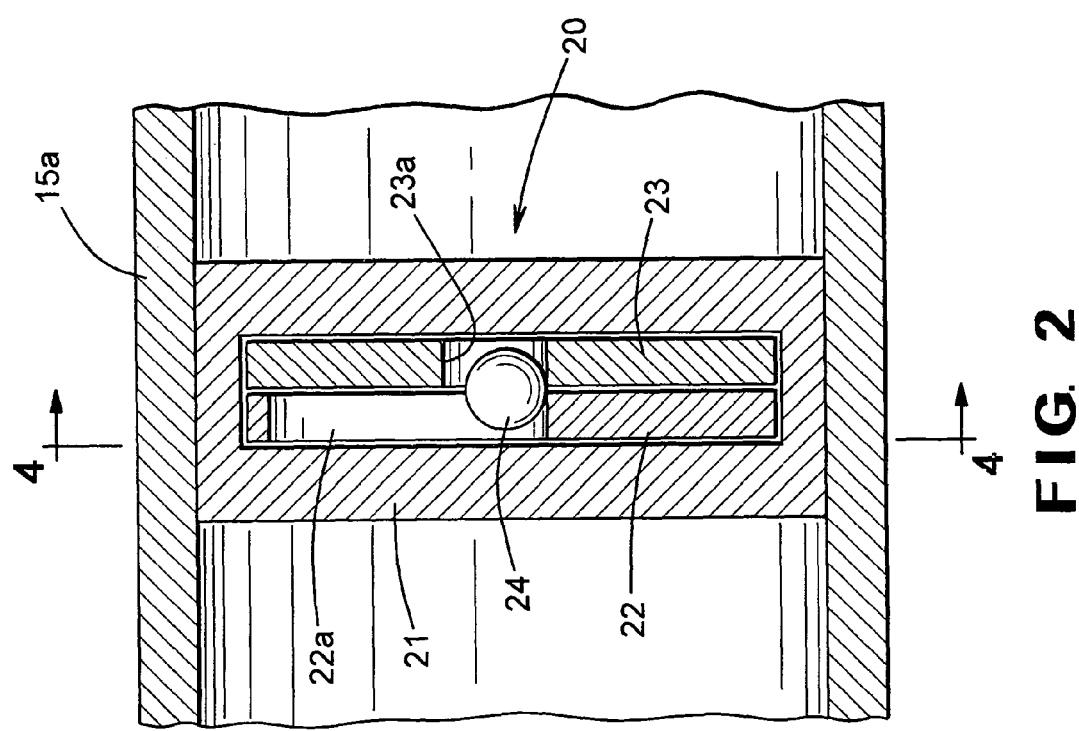
FIG. 2 is an enlarged sectional elevational view of a portion of the driveshaft assembly and the internal balance correction device illustrated in FIG. 1.
Figure 3:
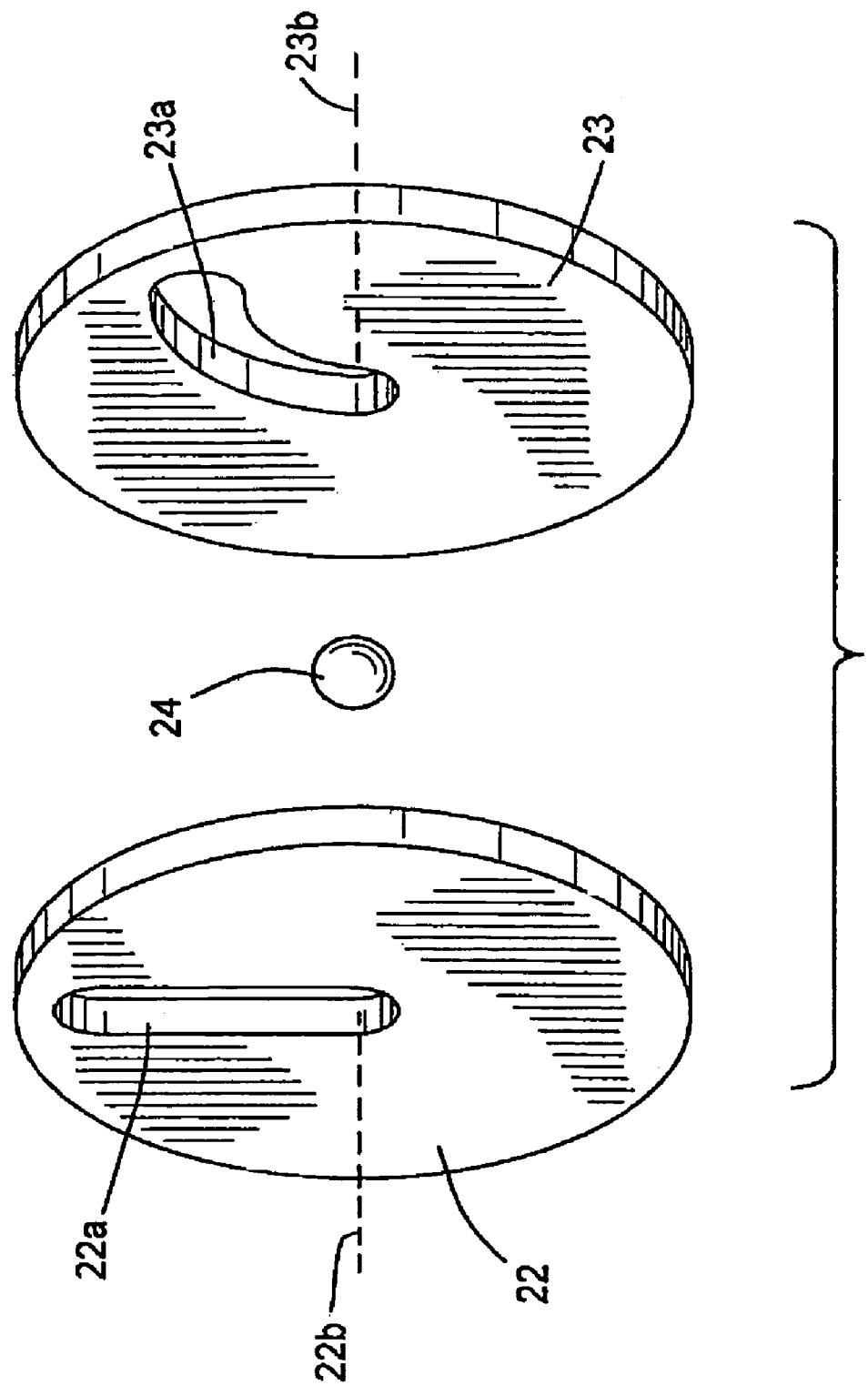
FIG. 3 is an exploded perspective view of the first and second discs and the ball of the internal balance correction device illustrated in FIGS. 1 and 2.

The structure of the internal balance correction device 20 is illustrated in detail in FIGS. 2 through 5. As shown therein, the internal balance correction device 20 includes a hollow housing 21 that is preferably formed from a rigid material, such as a metallic material. First and second discs 22 and 23 are disposed within the housing 21. As used herein, the term "disc" means any structure having any desired shape or size. As best shown in FIG. 3, the first disc 22 has a first slot 22a formed therein, while the second disc 23 has a second slot 23a formed therein. As used herein, the term "slot" means any opening or recess of any shape or size that is formed or otherwise provided in the first and second discs 22 and 23. When disposed within the housing 21, the first and second discs 22 and 23 are disposed adjacent to one another such that portions of the first and second slots 22a and 23a are axially aligned with one another. A ball 24 or other object having mass is disposed within the housing 21 of the internal balance correction device 20 and is received within the axially aligned portions of the first and second slots 22a and 23a. As best shown in FIG. 2, the ball 24 is preferably formed having an outer diameter that is slightly less than or approximately equal to the combined axial thicknesses of the first and second discs 22 and 23. Thus, generally semi-spherical portions of the ball 24 extend within the axially aligned portions of the first and second slots 22a and 23a.

The first and second slots 22a and 23a are preferably formed having respective shapes that are different from one another. In the illustrated embodiment, the first slot 22a begins at or near the rotational center of the first disc 22 and extends generally linearly outwardly therefrom, while the second slot 23a begins at or near the rotational center of the second disc 23 and extends generally arcuately outwardly therefrom. It will be appreciated, however, that the first and second slots 22a and 23a may be formed having any desired shapes. Because the slots 22a and 23a are preferably formed having different shapes, however, rotation of the first and second discs 22 and 23 relative to one another causes the radial location of the axially aligned portions of the first and second slots 22a and 23a to vary in a unique manner (i.e., each relative position of the first and second discs 22 and 23 defines a unique radial location of the axially aligned portions of the first and second slots 22a and 23a). As mentioned above, the ball 24 is received within the axially aligned portions of the first and second slots 22a and 23a. Thus, rotation of the first and second discs 22 and 23 relative to one another also causes the radial location of the ball 24 to vary.

As is well known, a typical balancing machine (not shown) includes a pair of fittings that are adapted to support the ends of the driveshaft assembly 13 (including the driveshaft tube 14 and the tube yokes 15a and 16a) thereon. The balancing machine further includes a motor for rotating the driveshaft assembly 13 at a predetermined speed. As the driveshaft assembly 13 is rotated, the balancing machine senses vibrations that are caused by imbalances in the structure of the driveshaft assembly 13. The balancing machine is responsive to such vibrations for determining both if the driveshaft assembly is out of balance and, if so, the magnitude and location of a corrective action that can be taken to counterbalance the imbalances of the driveshaft assembly such that it is balanced for rotation during use. For example, the size of a balance weight that is needed to correct the imbalance is related to the magnitude of the imbalance in the driveshaft assembly 13, while the location of such a balance weight that is needed to correct the imbalance is related to the circumferential position of the imbalance in the driveshaft assembly 13. In the manner described below, the first and second discs 22 and 23 of the internal balance correction device 20 are selectively moved relative to one another so as to position the ball 24 at such a location as to counterbalance the imbalance of the driveshaft assembly 13, both in magnitude and in circumferential position.

Figure 4:
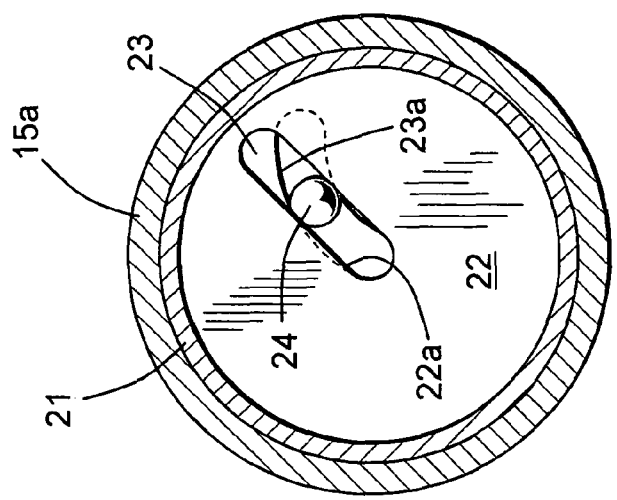
FIG. 4 is a sectional elevational view taken along line 4—4 of FIG. 2, wherein the first and second discs are shown in a first relative orientation.

FIG. 4 is a sectional elevational view of the sleeve portion of the tube yoke 15a and the internal balance correction device 20 showing the first and second discs 22 and 23 in a first relative orientation. As shown therein, the first and second discs 22 and 23 are oriented such that the axially aligned portions of the first and second slots 22a and 23a (and, thus, the ball 24) are located at or near the centers of the discs 22 and 23 and, therefore, the rotational centers of the sleeve portion of the tube yoke 15a and the remainder of the driveshaft assembly 13. In this first relative orientation, the ball 24 exerts little, if any, influence on the rotational balance of the tube yoke 15a and the driveshaft assembly 13 as a whole.

Figure 5:
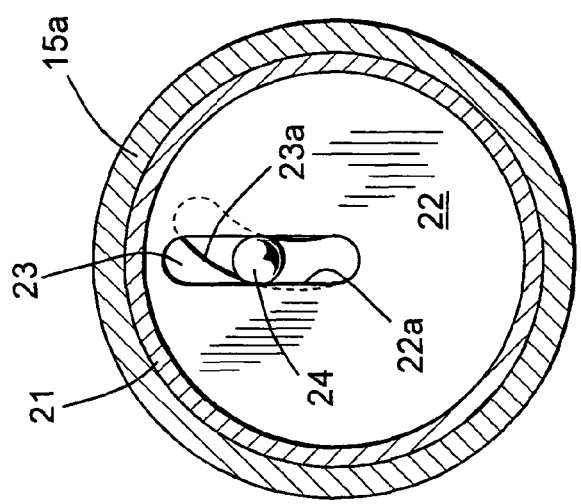
FIG. 5 is a sectional elevational view similar to FIG. 4, wherein the first and second discs are shown in a second relative orientation.

FIG. 5 is a sectional elevational view similar to FIG. 4 showing the first and second discs 22 and 23 in a second relative orientation. As shown therein, the second disc 23 has been rotated counter-clockwise relative to the first disc 22, the housing 21 of the internal balance correction device 20, and the sleeve portion of the tube yoke 15a from the position illustrated in FIG. 4. Consequently, the axially aligned portions of the first and second slots 22a and 23a (and, thus, the ball 24) are located at a predetermined radial distance away from the centers of the discs 22 and 23 and, therefore, the rotational centers of the sleeve portion of the tube yoke 15a and the remainder of the driveshaft assembly 13. In this second relative orientation, the ball 24 exerts a measurable influence on the rotational balance of the tube yoke 15a and the driveshaft assembly 13 as a whole. The amount of such influence is directly related to the amount of the radial distance between the ball 24 and the rotational center of the sleeve portion of the tube yoke 15a. Accordingly, if the magnitude of the imbalance in the driveshaft assembly 13 is relatively small, then the first and second discs 22 and 23 will be oriented in such a manner as to position the ball 24 relatively close to the rotational center of the sleeve portion of the tube yoke 15a. Conversely, if the magnitude of the imbalance in the driveshaft assembly 13 is relatively large, then the first and second discs 22 and 23 will be oriented in such a manner as to position the ball 24 relatively far from the rotational center of the sleeve portion of the tube yoke 15a to counteract the imbalance. Preferably, the first and second discs 22 and 23 are positioned relative to one another so that the amount of influence that the ball 24 exerts on the rotational balance of the driveshaft assembly 13 is exactly equal to the amount of imbalance that is measured therein by the balancing machine.

Figure 6:
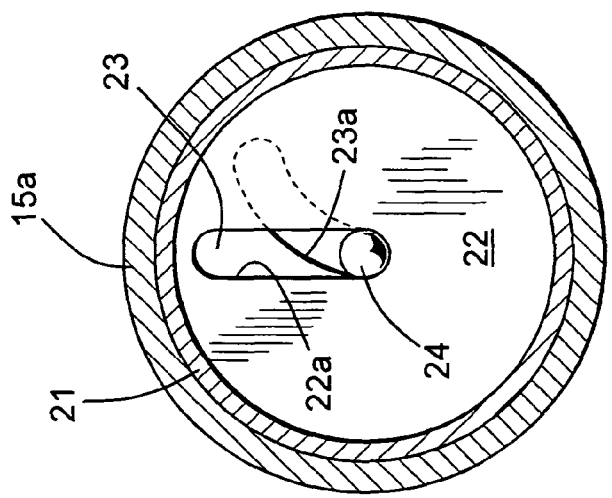
FIG. 6 is a sectional elevational view similar to FIG. 5, wherein the first and second discs and the ball are shown in a third relative orientation.

FIG. 6 is a sectional elevational view similar to FIG. 5 showing the first and second discs 22 and 23 in a third relative orientation. As shown therein, the first and second discs 22 and 23, as a unit, have been rotated clockwise relative to the housing 21 of the internal balance correction device 20 and the sleeve portion of the tube yoke 15a from the positions illustrated in FIG. 5 (approximately forty-five degrees in the illustrated embodiment). Consequently, the axially aligned portions of the first and second slots 22a and 23a (and, thus, the ball 24) are located at a predetermined circumferential position relative to the sleeve portion of the tube yoke 15a. In this third relative orientation, the ball 24 continues to exert a measurable influence on the rotational balance of the tube yoke 15a and the remainder of the driveshaft assembly 13. Preferably, the first and second discs 22 and 23 are positioned relative to the tube yoke 15a and the remainder of the driveshaft assembly 13 such that direction of the influence that the ball 24 exerts on the rotational balance of the driveshaft assembly 13 is exactly opposite to the direction of the imbalance that is measured therein by the balancing machine. Thus, by (1) orienting the first and second discs 22 and 23 relative to one another to determine a magnitude of the counterbalancing force that will be exerted by the ball 24 when the driveshaft assembly 13 is rotated, and by (2) orienting the first and second discs 22 and 23 relative to the tube yoke 15a and the remainder of the driveshaft assembly 13 to determine a direction of the counterbalancing force that will be exerted by the ball 24 when the driveshaft assembly 13 is rotated, the internal balance correction device 20 can function to balance the driveshaft assembly 13 as a whole for rotation during use.

The first and second discs 22 and 23 can be positioned as described above in any desired manner. For example, as discussed above, a conventional balancing machine can be used to determine the magnitude and location of a corrective action that can be taken to counterbalance the imbalances of the driveshaft assembly such that it is balanced for rotation during use. In response to such determination, the first and second discs 22 and 23 can be manually positioned to position the ball 24 so as to achieve the desired counterbalancing effect. Such manual positioning can be accomplished, for example, by providing respective arm portions (such as shown schematically at 22b and 23b in FIG. 3) on each of the first and second discs 22 and 23 that extend axially through the housing 21 and the end of the tube yoke 15a so as to be easily reached and manipulated by conventional tools. In this situation, the first and second discs 22 and 23 are preferably retained within the housing 21 in a press fit relationship that frictionally maintains such first and second discs 22 and 23 in predetermined orientation, but allows the first and second discs 22 and 23 to be moved when manipulated as described above. Alternatively, the first and second discs 22 and 23 can be maintained in the predetermined orientation after being manipulated by the use of adhesives, heat sensitive materials, mechanical locks and retainers, and the like.

Figure 7:
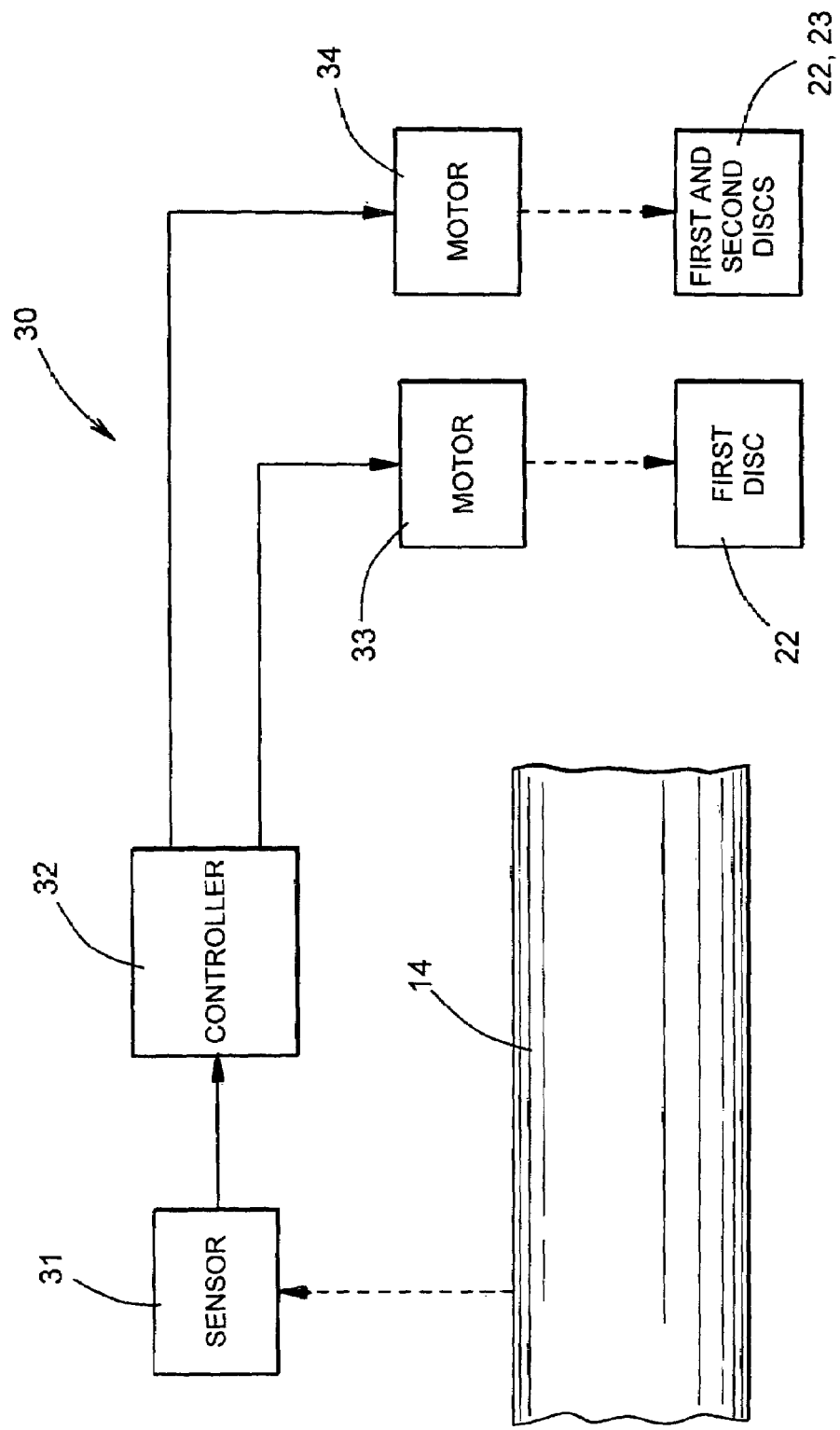
FIG. 7 is a block diagram of a closed loop control system for continuously and actively operating the internal balance weight correction device illustrated in FIGS. 1 through 6.

FIG. 7 is a block diagram of a closed loop control system, indicated generally at 30, for continuously and actively operating the internal balance correction device 20 illustrated in FIGS. 1 through 6. As shown therein, the control system 30 includes one or more sensors 31 that are provided on the driveshaft assembly 13 or on another portion of the vehicle in which the driveshaft assembly 13 is provided. The sensor 31 is responsive to vibrations of the driveshaft assembly 13 as it is operated for determining the magnitude and location of a corrective action that can be taken to counterbalance the imbalances of the driveshaft assembly such that it is balanced for rotation during use. The signal from the sensor 31 is fed to a controller 32, which can be embodied as any conventional electronic computing device, such as a microprocessor or a programmable controller. The controller 32 is responsive to the signals from the sensor 31 for generating control signals to first and second motors 33 and 34. The first motor 33 is connected to the second disc 23 of the internal balance correction device 20 for rotating it relative to the first disc 22 as described above to adjust the amount of influence that the ball 24 exerts on the rotational balance of the driveshaft assembly 13. The second motor 34 is connected to the first and second discs 22 and 23 of the internal balance correction device 20 for rotating them relative to the sleeve portion of the tube yoke 15a as described above to adjust the direction of influence that the ball 24 exerts on the rotational balance of the driveshaft assembly 13. The control system can be disposed and supported within the driveshaft tube 14 or at any other desired location. Thus, as the driveshaft assembly 13 is operated, the controller 32 can continuously and actively operate the internal balance correction device 20 to rotational balance the driveshaft assembly 13.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly that is balanced for rotation comprising:
a hollow article that is unbalanced for rotation; and
a balance correction device supported within said hollow unbalanced article, said balance correction device including a housing that is supported within said hollow unbalanced article, a first disc disposed within said housing and having a first slot provided therein; a second disc disposed within said housing and having a second slot provided therein; and an object disposed within said housing and received within said first and second slots, wherein said first and second discs are positioned relative to one another to position said object relative to said unbalanced article to balance the assembly for rotation.

2. The assembly defined in claim 1 wherein said first slot extends generally linearly.

3. The assembly defined in claim 1 wherein said second slot extends generally arcuately.

4. The assembly defined in claim 1 wherein said first slot extends generally linearly, and wherein said second slot extends generally arcuately.

5. The assembly defined in claim 1 wherein said object is a ball.

* * * * *